United States Patent
Lejeune et al.

(10) Patent No.: US 8,915,321 B2
(45) Date of Patent: Dec. 23, 2014

(54) DEVICE FOR REMOVABLY ATTACHING A BATTERY OF A MOTOR VEHICLE

(75) Inventors: Francois-Xavier Lejeune, Meudon (FR); Mickael Turpin, Mulsanne (FR); Joel Thevenart, Plaisir (FR); Emmanuel Richez, Antouillet (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 13/812,396

(22) PCT Filed: Jul. 12, 2011

(86) PCT No.: PCT/FR2011/051661
§ 371 (c)(1),
(2), (4) Date: Apr. 4, 2013

(87) PCT Pub. No.: WO2012/013886
PCT Pub. Date: Feb. 2, 2012

(65) Prior Publication Data
US 2013/0180791 A1   Jul. 18, 2013

(30) Foreign Application Priority Data
Jul. 26, 2010  (FR) ..................................... 10 56130

(51) Int. Cl.
*B60R 16/04* (2006.01)
*B60K 1/04* (2006.01)
*H01M 2/10* (2006.01)

(52) U.S. Cl.
CPC ............... *B60K 1/04* (2013.01); *H01M 2/1083* (2013.01); *B60K 2001/0438* (2013.01); *B60K 2001/0472* (2013.01); *Y02T 90/124* (2013.01)
USPC .......................... 180/68.5; 411/349; 411/549

(58) Field of Classification Search
CPC .................................. B60R 16/04; F16B 21/02
USPC .................................. 180/68.5; 411/349, 549
See application file for complete search history.

(56) References Cited

U.S. PATENT DOCUMENTS

| | | | | |
|---|---|---|---|---|
| 2,390,325 | A | * | 12/1945 | Rapp .......................... 411/366.1 |
| 2,478,972 | A | * | 8/1949 | Luce .............................. 411/551 |
| 3,169,293 | A | * | 2/1965 | Neuschotz .................... 411/552 |
| 3,827,110 | A | * | 8/1974 | Dzus et al. .................... 411/555 |
| 4,657,462 | A | * | 4/1987 | Hoen ............................ 411/552 |

(Continued)

FOREIGN PATENT DOCUMENTS

| | | |
|---|---|---|
| DE | 10 2007 032210 | 10/2008 |
| FR | 2 157 430 | 6/1973 |
| FR | 2 936 760 | 4/2010 |
| FR | 2 940 638 | 7/2010 |

OTHER PUBLICATIONS

International Search Report Issued Sep. 12, 2011 in PCT/FR11/51661 Filed Jul. 12, 2011.

*Primary Examiner* — Jeffrey K Restifo
(74) *Attorney, Agent, or Firm* — Oblon, Spivak, McClelland, Maier & Neustadt, L.L.P.

(57) ABSTRACT

A device for the removable attachment of a battery of a motor vehicle includes a top portion including an attachment to a motor vehicle, a bottom portion including a connection with the battery, and a latch and a screw including a threaded portion so as to allow locking and unlocking, then the mutual tightening and loosening of the top portion and the bottom portion.

12 Claims, 3 Drawing Sheets

(56) References Cited

U.S. PATENT DOCUMENTS

| | | | |
|---|---|---|---|
| 5,036,938 A * | 8/1991 | Blount et al. | 180/208 |
| 5,073,075 A * | 12/1991 | Duran | 411/552 |
| 5,370,488 A * | 12/1994 | Sykes | 411/551 |
| 5,413,392 A * | 5/1995 | Schlack et al. | 292/204 |
| 5,501,289 A | 3/1996 | Nishikawa et al. | |
| 5,688,093 A * | 11/1997 | Bowers | 411/552 |
| 5,716,180 A * | 2/1998 | Bowers | 411/551 |
| 5,795,122 A * | 8/1998 | Bowers | 411/551 |
| 6,267,543 B1 * | 7/2001 | David et al. | 411/552 |
| 7,044,701 B2 * | 5/2006 | Herb | 411/84 |
| 7,070,374 B2 * | 7/2006 | Womack et al. | 410/104 |
| 7,281,889 B2 * | 10/2007 | Anderson et al. | 410/104 |
| 7,401,995 B2 * | 7/2008 | Senakiewich, II | 403/374.4 |
| 7,610,978 B2 * | 11/2009 | Takasaki et al. | 180/68.5 |
| 7,997,843 B2 * | 8/2011 | Bowers et al. | 411/533 |
| 8,342,328 B2 * | 1/2013 | Trapp et al. | 206/480 |
| 8,430,615 B2 * | 4/2013 | Chen et al. | 411/107 |
| 8,491,246 B2 * | 7/2013 | Chao et al. | 411/349 |
| 8,657,545 B2 * | 2/2014 | Magno et al. | 411/349 |
| 2009/0074539 A1 * | 3/2009 | Mahdavi | 411/533 |
| 2010/0145717 A1 | 6/2010 | Hoeltzel | |
| 2012/0040219 A1 * | 2/2012 | Cappellotti et al. | 429/99 |
| 2012/0255800 A1 * | 10/2012 | Lejeune et al. | 180/68.5 |
| 2013/0180791 A1 * | 7/2013 | Lejeune et al. | 180/68.5 |

* cited by examiner

DEVICE FOR REMOVABLY ATTACHING A BATTERY OF A MOTOR VEHICLE

BACKGROUND

The present invention relates to a device for the removable attachment of a container of energy for powering a motor for driving a motor vehicle, and to a method for mounting/removing such an energy container. It also relates to a motor vehicle as such incorporating such a device for attaching a powering energy container.

Certain motor vehicles, such as electric or hybrid vehicles, comprise a container of energy for powering a drive motor, such as an electric battery for powering an electric motor. When the energy level of this battery is low, it is necessary to recharge it or to replace it with another charged battery. An exchange can for example be carried out in a station similar to a service station in which it is possible to fill a gasoline tank of a motor vehicle.

DESCRIPTION OF THE RELATED ART

Known from document U.S. Pat. No. 5,612,606 is a station for exchanging an electric battery for powering a motor for driving an electric vehicle and a method for carrying out such an exchange. In the exchange station described, the driver approximately positions the vehicle in a rail against a longitudinal abutment relative to the items of equipment of the station. Thereafter, in phases that are more or less automatic, movable means for taking out the electric battery and assembling the new battery to the vehicle come to be positioned in relation to the vehicle by virtue of sensors. The quantity of sensors and electronic means necessary for the operation of such a station makes it difficultly reliable and involves its operation being not very robust. Document U.S. Pat. No. 5,998,963 similarly describes another battery-exchange station for motor vehicles.

BRIEF SUMMARY

For an easy deployment of the motor vehicles fitted with a battery, it is necessary to propose a reliable and robust system for the work on the vehicle when its battery is discharged.

Thus, the general object of the invention is to supply a solution satisfying this requirement and remedying the drawbacks mentioned above of the known methods of the prior art.

Accordingly, the invention is based on a device for the removable attachment of a battery of a motor vehicle, characterized in that it comprises a top portion comprising a means for attachment to a motor vehicle and a bottom portion comprising a means for connection with the battery, and in that it comprises a latch and a screw comprising a threaded portion so as to allow the locking and unlocking then the mutual tightening and loosening of the two portions, the top portion and bottom portion.

The device for the removable attachment of a battery may also comprise an abutment interacting with the latch, the latter comprising a threaded opening interacting with the threaded portion of the screw so that a first rotation of the screw causes the rotation of the latch until it rests against the abutment and so that a second rotation of the screw causes the screwing of the latch onto the screw.

The means for connection with the battery of the bottom portion may consist of a horizontal surface that can support the vertical pressure of the battery.

The top portion may comprise a substantially flat bottom surface comprising an opening to a hollow volume, forming a lock, and the bottom portion may comprise the latch and the screw.

The bottom portion may comprise a main body within which is mounted so as to be able to rotate the screw which extends in a vertical direction and above this main body in order to interact with the latch.

The bottom portion may comprise a top opening through which the screw passes, the latch being above this opening.

The invention also relates to a method for mounting/removing a battery on a motor vehicle, with the aid of a removable attachment device as described above, characterized in that it comprises the following steps:

(E1): positioning of a latch of a male portion within an opening of a female portion;

(E2): rotation of the latch in order to obtain its locking/unlocking within the female portion so as to lock/unlock the battery on the motor vehicle;

(E3): rotation of a screw comprising a threaded portion in order to obtain the tightening/loosening of the removable attachment device.

The second step (E2) may comprise the rotation of the screw causing the rotation of the latch until it arrives against an abutment and the third step may comprise the rotation of the screw inducing the interaction of its threaded portion with a threaded portion of the latch, the latter remaining rotatably fixed against the abutment.

The invention also relates to a bottom portion of a device for the removable attachment of a battery of a motor vehicle, characterized in that it comprises a means for connection to a battery, and in that it comprises a latch connected to a screw comprising a threaded portion so as to allow the locking and unlocking and then the tightening and loosening with a top portion by a double step of rotation of the screw.

The invention also relates to a motor vehicle comprising a power-supply battery, characterized in that it comprises at least one device for the removable attachment of its battery as described above.

The top portion of the at least one removable attachment device may be attached under the chassis or under the trunk of the motor vehicle.

BRIEF DESCRIPTION OF THE DRAWINGS

These objects, features and advantages of the present invention will be explained in detail in the following description of a particular embodiment given by way of a nonlimiting example with respect to the attached figures, amongst which:

FIGS. 3 to 6 represent schematically the device for the removable attachment of a battery to a motor vehicle in several configurations corresponding to various steps of a method for mounting a battery on a motor vehicle.

DETAILED DESCRIPTION

The invention applies to any motor vehicle comprising a powering energy container, positioned for example in the rear trunk or under the chassis. In the rest of the description, the mounting of an energy container will be described through the description of the mounting of a battery for electrically powering a drive motor of a vehicle. The invention however applies to any type of power-supply container.

The concept of the invention is based on a removable attachment of the battery to the motor vehicle so as to be able to easily remove it in order to exchange it and/or recharge it when necessary, while ensuring it is reliably and securely held when the vehicle is on the road, by a principle of locking/unlocking combined with a principle of tightening/loosening.

Figure 1:
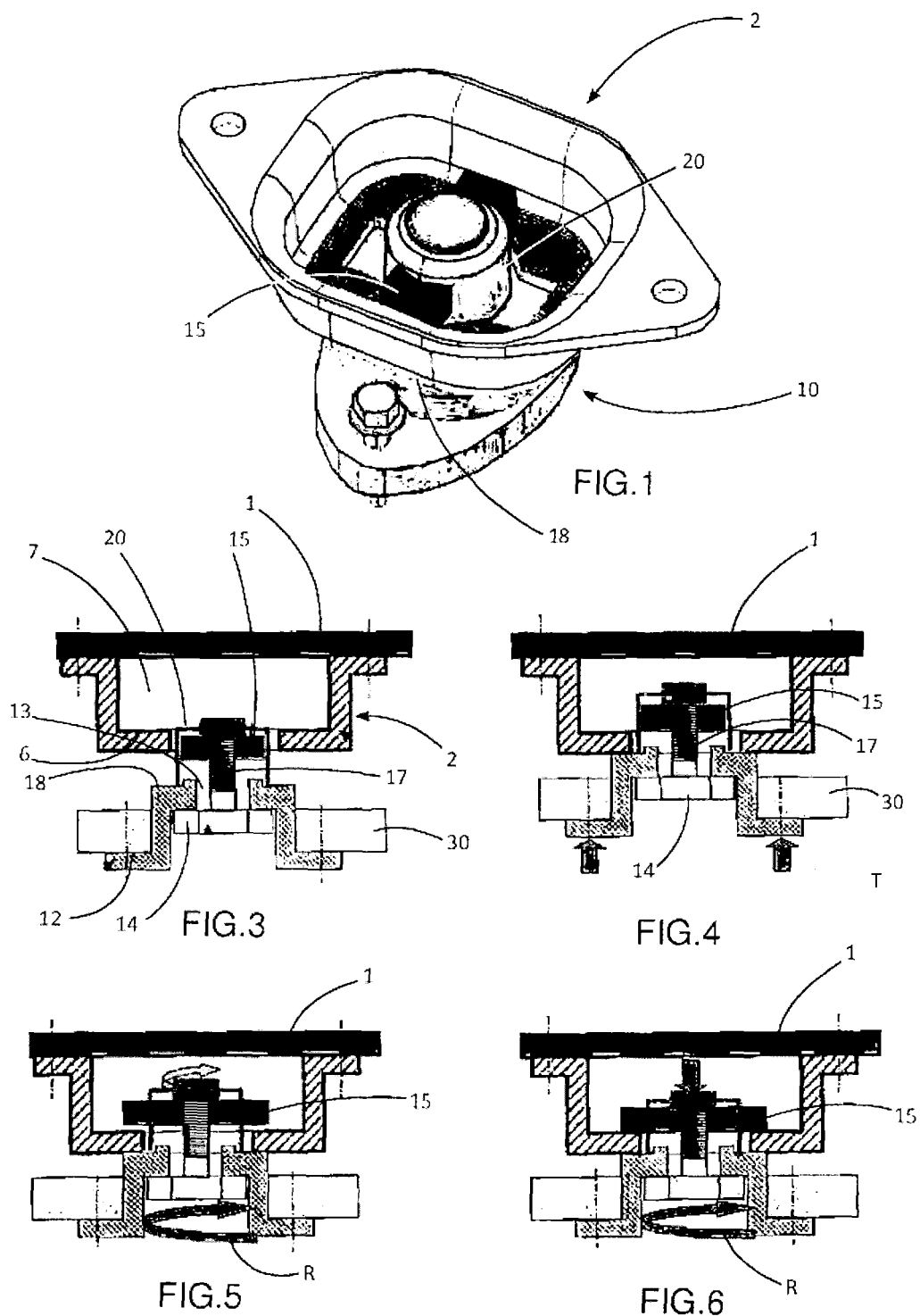
FIG. 1 represents in perspective from above a device for the removable attachment of a battery to a motor vehicle according to one embodiment of the invention.
Figure 2:
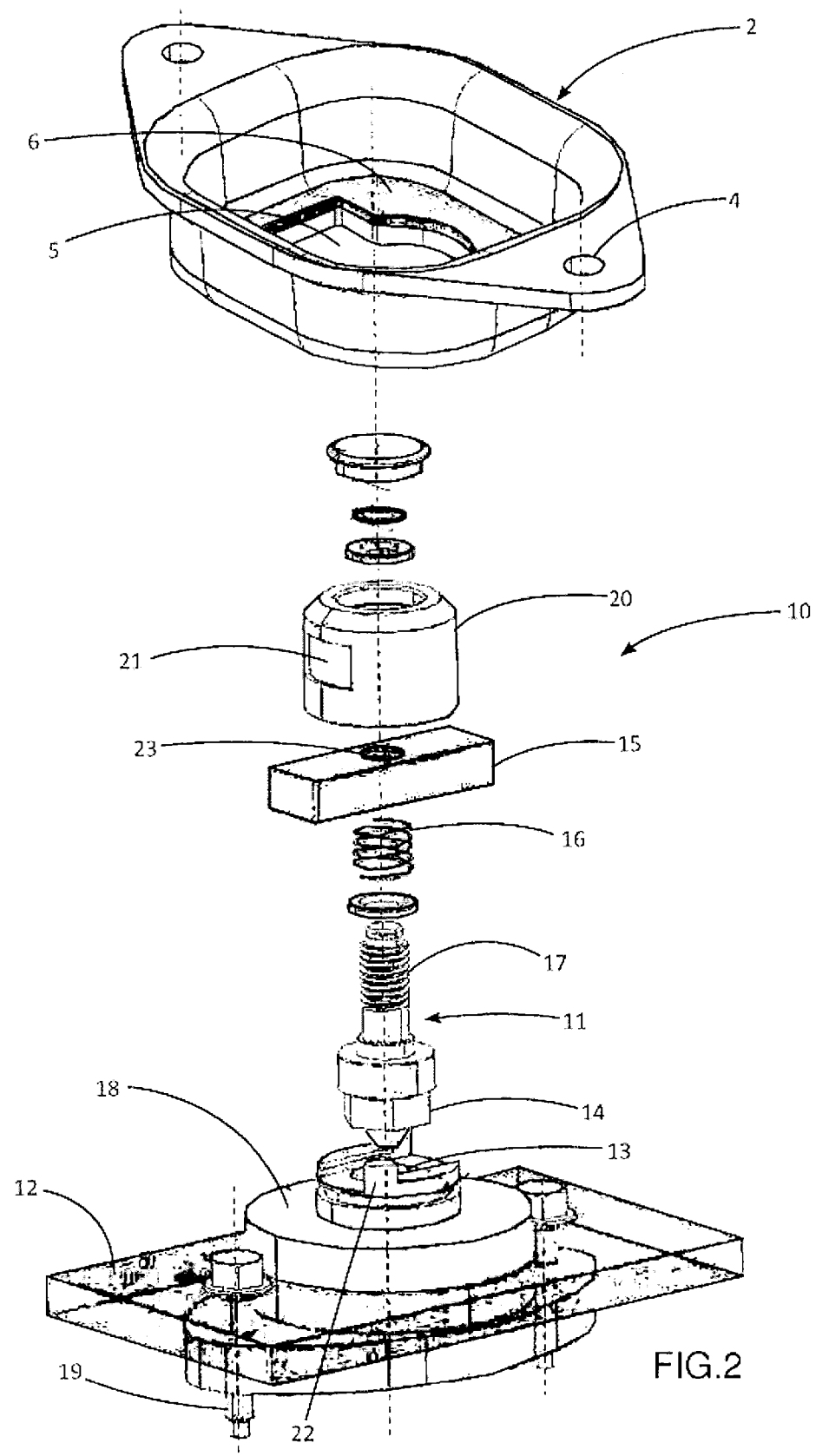
FIG. 2 represents in exploded perspective the device for the removable attachment of a battery to a motor vehicle according to the embodiment of the invention.
Figure 7:
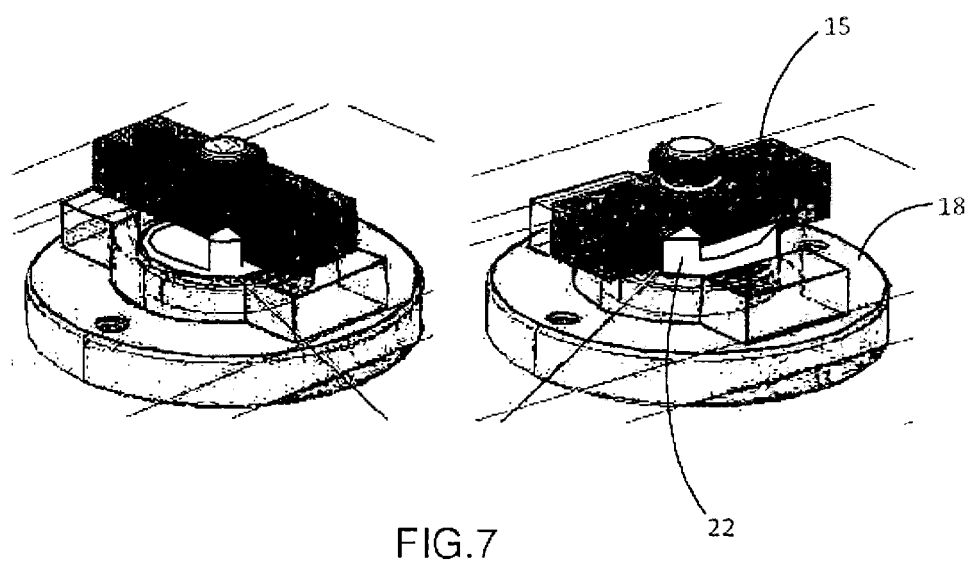
FIG. 7 represents a view in perspective of the latch of the device for the removable attachment of a battery to a motor vehicle according to the embodiment of the invention.

FIGS. 1 and 2 illustrate the device for the removable attachment of a battery according to the embodiment of the invention. This device comprises a female top portion 2 interacting with a male bottom portion 10. The top portion 2 comprises attachment means 4 in its top portion, consisting of openings, provided for attachment to a frame arranged on the bottom portion of a motor vehicle. Finally, it comprises an opening 5 in its bottom surface 6, which fulfills the function of a keyhole, in order to interact with a latch 15 of the male portion 10 described below.

The male bottom portion 10 comprises mainly a central shaft consisting of a screw 11 comprising a head 14 in its bottom portion, and a screw thread 17 in its top portion, extended by an elastic means 16 and a latch 15. The latter is covered by a cylindrical cap 20 of which the dimension corresponds to the central rounded portion of the opening 5 forming a keyhole of the female portion 2. The cap 20 has openings 21 allowing the ends of the latch 15 to pass through. The latch 15 also comprises a threaded central opening 23 which interacts with the screw thread 17 of the screw 11 in order to fulfill the function of a nut, which will be explained below. The latch 15 is therefore able to move in translation and rotation relative to a main body of the bottom portion 10 of the device for removable attachment, which comprises a top surface 12 serving as an interface for the attachment of a motor-vehicle battery 30, attached to the body by attachment means 19, and a spacer of which the top surface 18 is designed to come into contact with the bottom surface of the female portion 2. Finally, this main body comprises, in its top portion, designed to be housed within the lock of the female portion 2, an abutment 22 which interacts with the latch 15, as will be explained in detail below. The screw 11 extends beyond the top surface of the main body through an opening 13. Finally, seals, not shown, ensure that the device is sealed.

FIGS. 3 to 6 illustrate the various steps of a method for mounting a battery on a motor vehicle with the aid of a removable attachment device according to the invention as described above.

FIG. 3 represents a configuration in which the two portions, the top portion 2 and the bottom portion 10, of the removable attachment device are unlocked and independent of one another. The female portion 2 is attached to a frame 1 placed in the bottom portion of a motor vehicle, not shown, the bottom male portion 10 to which a battery 30 is attached therefore being separated from the motor vehicle.

FIG. 4 represents the first step E1 of the method for mounting the battery 30, in which the bottom male portion 10 of the attachment device is brought up under the top female portion 2, in a vertical translation T, making it possible to insert the cap 20 and the latch 15 into the volume 7 brought about by the female top portion 2 of the device, through its opening 5 forming a lock. As a remark, this step of inserting the latch 15 into the lock of the female portion requires the correct orientation of the latch, of which the length is aligned on the corresponding lengthwise axis of the opening 5 in order to allow it to pass through, as shown in FIG. 4. At the same time, the top surface 18 of the spacer of the bottom portion 10 presses on the bottom surface 6 of the top portion 2. This movement of the bottom portion 10 of the removable attachment device, to which the battery 30 is attached, is obtained by any means, preferably automatically with the aid of a vertical lifting means, optionally supplemented by a means for horizontal movement in order to bring the assembly under the motor vehicle.

FIG. 5 illustrates the second step E2 of the mounting method which consists in a rotation R of the screw 11 so as to cause a rotation of the latch 15 causing it to lock. For this, the head 14 of the screw 11 comprises a connection means in its bottom surface allowing its actuation by a tool of the screw gun type for achieving its rotation. This rotation R modifies the orientation of the latch 15 in a configuration in which it remains locked within the hollow volume 7 of the top portion 2 of the device without being able to escape through the bottom opening 5. In the chosen embodiment, a rotation by a quarter turn is sufficient during this step E2, which terminates with the positioning of the latch 15 pressing on the abutment 22, preventing any subsequent rotation of the latch 15. As a comment, the screw 11 surmounted by the latch 15 forms a T-shaped assembly suitable for interacting with the opening 5 of the top portion 2 which similarly comprises an elongate shape allowing the T to be inserted in step E1 and a narrower portion that allows its locking after the rotation of the latch 15. In this step, the latch is raised sufficiently above the bottom surface 6 of the lock in order to be able to turn without having to overcome excessive friction on this surface.

FIG. 6 illustrates the third step E3 of the mounting method which consists in continuing the rotation R of the screw 11 causing the relative descent of the latch 15 by dint of its interaction with the threaded portion 17 of the screw. The latch 15, prevented from rotating by the abutment 22, operates like a nut in this step, until it abuts against and tightens on the surface 6 of the opening 5 within the female portion 2. FIG. 6 illustrates the final, locked and tightened configuration of the attachment device at the end of this step E3.

As a comment, the invention also relates to the method for removing the battery 30, which comprises the reverse steps of the mounting method described above, since these steps are reversible. In the removal, the elastic means 16 promote the raising of the latch 15 for its unlocking.

Finally, the invention therefore relates to a method for mounting/removing a battery on a motor vehicle with the aid of a removable attachment device, comprising the following essential steps:

E1: positioning of a latch 15 of a male portion within an opening 5 of a female portion 2;

E2: rotation of the latch 15 in order to obtain its locking/unlocking within the female portion 2 so as to lock/unlock the battery on the motor vehicle;

E3: rotation of a screw 11 comprising a threaded portion 17 interacting with the latch 15 in order to obtain the tightening/loosening of the latch 15 within the female portion 2 and hence the tightening/loosening of the device for attaching the battery.

The second step E2 may consist of a quarter-turn rotation of the latch 15, or even any other rotation that is less than or equal to one turn. The third step E3 consists of a tightening rotation, in which the latch 15 and the rest of the male portion of the attachment device are brought closer to one another. The final result is a reliable and secure attachment, the surface 6 of the top portion 2 being sandwiched between the latch 15 and the surface 18 of the spacer.

The method can be carried out manually. Preferably, it is carried out by a tool of the screw gun type in order to apply considerable rotary forces making it possible to achieve an efficient locking and tightening.

Naturally, the mounting method also comprises a preliminary step of connecting the battery 30 to the interface 12 provided on the bottom portion of the attachment device.

The battery 30 has been shown schematically: it can be positioned in a battery tray, consisting of a substantially parallelepipedal support, attached to several devices for the removable attachment of a battery. For example, four removable attachment devices may be used for each bottom corner of the battery tray for the purpose of connecting them to the motor vehicle at four attachment points. As a variant, the battery could be placed in a tray of different shape or directly connected to one or more removable attachment devices. Moreover, four attachment devices may be used but any other number greater than or equal to 1 could also be suitable.

Naturally, the invention is not limited to the particular geometry of the embodiment described above as a nonlimiting example. Therefore, the geometry of the screw 11, of the latch 15, of the lock 5, 6, 7 could have other shapes without departing from the concept of the invention. The latch 15 and the nut could consist of two distinct elements. The female and male portions of respectively the top portion 2 of the attachment device and of the bottom portion 10 of the same device may be inverted, the latch then belonging to the top portion and the bottom portion forming a lock. More generally, any geometry can be envisaged for implementing the interaction between the two components of the attachment device by virtue of a double movement of locking and then of tightening about a vertical axis.

Finally, the solution of the invention achieves the following advantages:
- it allows a rapid replacement of a battery in a specialized exchange station for example;
- it allows the fixed retention of the battery when the vehicle moves, even in the event of sharp acceleration;
- it allows a large number of exchanges with little wear.

The invention claimed is:

1. A device for the removable attachment of a battery of a motor vehicle, comprising:
   a top portion comprising a means for attachment to a motor vehicle;
   a bottom portion comprising a means for connection with the battery; and
   a latch which is a continuous member with a rectangular cross-section, a first end and a second end, and
   a screw comprising a threaded portion so as to allow locking and unlocking, then the mutual tightening and loosening of the top portion and the bottom portion,
   wherein the first end and the second end of the latch are on opposite sides of the screw.

2. The device for the removable attachment of a battery of a motor vehicle as claimed in claim 1, further comprising:
   an abutment interacting with the latch, the latch comprising a threaded opening interacting with the threaded portion of the screw so that a first rotation of the screw causes the rotation of the latch until it rests against the abutment and so that a second rotation of the screw causes the screwing of the latch onto the screw.

3. The device for the removable attachment of a battery of a motor vehicle as claimed in claim 1, wherein the means for connection with the battery of the bottom portion includes a horizontal surface that can support the vertical pressure of the battery.

4. The device for the removable attachment of a battery of a motor vehicle as claimed in claim 1, wherein
   the top portion comprises a substantially flat bottom surface comprising an opening to a hollow volume, forming a lock, and
   the bottom portion comprises the latch and the screw.

5. The device for the removable attachment of a battery of a motor vehicle as claimed in claim 4, wherein the bottom portion comprises a main body within which the screw is mounted so as to be able to rotate, and the screw extends in a vertical direction and above the main body in order to interact with the latch.

6. The device for the removable attachment of a battery of a motor vehicle as claimed in claim 5, wherein the bottom portion comprises a top opening through which the screw passes, the latch being above this opening.

7. A motor vehicle, comprising:
   a power-supply battery; and
   at least one device for the removable attachment of the battery as claimed in claim 1.

8. The motor vehicle as claimed in claim 7, wherein the top portion of the at least one removable attachment device is attached under the chassis or under the trunk of the motor vehicle.

9. The device for the removable attachment of a battery of a motor vehicle, as claimed in claim 1, wherein elastic means facilitate unlocking by helping to raise latch.

10. A method for mounting/removing a battery on a motor vehicle, with the aid of a removable attachment device with a first portion for attachment to the motor vehicle, a second portion for connection with the battery, a latch which is a continuous member with a rectangular cross-section, a first end and a second end, and a screw comprising a threaded portion, with the first end and the second end of the latch on opposite sides of the screw, the method comprising:
   positioning of a latch of the first portion within an opening of the second portion;
   rotating the latch in order to obtain its locking/unlocking within the second portion so as to lock/unlock the battery on the motor vehicle; and
   rotating the screw comprising a threaded portion in order to obtain the tightening/loosening of the removable attachment device.

11. The method for mounting/removing a battery on a motor vehicle as claimed claim 10, wherein
   the rotating the latch comprises the rotation of the screw causing the rotation of the latch until the latch arrives against an abutment, and
   the rotating the screw comprises the rotation of the screw inducing the interaction of the threaded portion of the screw with a threaded portion of the latch, the latch remaining rotatably fixed against the abutment.

12. A bottom portion of a device for the removable attachment of a battery of a motor vehicle, comprising
   means for connection to a battery; and
   a latch which is a continuous member with a rectangular cross-section, a first end and a second end, with the latch connected to a screw comprising a threaded portion so as to allow the locking and unlocking and then the tightening and loosening with a top portion by a double step of rotation of the screw,
   wherein the first end and the second end of the latch are on opposite sides of the screw.

* * * * *